United States Patent
Marque-Pucheu et al.

(10) Patent No.: US 8,014,778 B2
(45) Date of Patent: Sep. 6, 2011

(54) HANDOVER MANAGEMENT IN GROUP CALLS

(75) Inventors: Gérard Marque-Pucheu, Verneuil sur Seine (FR); Christophe Molko, Villepreux (FR)

(73) Assignee: EADS Secure Networks, Elancourt (FR)

( * ) Notice: Subject to any disclaimer, the term of this patent is extended or adjusted under 35 U.S.C. 154(b) by 745 days.

(21) Appl. No.: 12/090,814

(22) PCT Filed: Oct. 20, 2006

(86) PCT No.: PCT/IB2006/002939
§ 371 (c)(1),
(2), (4) Date: Apr. 18, 2008

(87) PCT Pub. No.: WO2007/045983
PCT Pub. Date: Apr. 26, 2007

(65) Prior Publication Data
US 2008/0293406 A1    Nov. 27, 2008

(30) Foreign Application Priority Data
Oct. 20, 2005    (FR) ..................... 05 10731

(51) Int. Cl.
*H04W 36/00*    (2009.01)
(52) U.S. Cl. ............. 455/436; 455/432.1; 455/518; 455/519; 370/331; 370/335; 370/336
(58) Field of Classification Search ........... 455/518, 455/519, 432.1, 436; 370/330, 331, 335, 370/336
See application file for complete search history.

(56) References Cited

U.S. PATENT DOCUMENTS

| | | | | |
|---|---|---|---|---|
| 5,448,752 | A | * | 9/1995 | Mabey .................... 455/518 |
| 5,506,837 | A | * | 4/1996 | Sollner et al. ............ 370/296 |
| 6,219,548 | B1 | * | 4/2001 | Feltner et al. ............ 455/433 |
| 6,292,670 | B1 | | 9/2001 | Kauria et al. |
| 7,099,290 | B2 | * | 8/2006 | Needham et al. ........ 370/331 |

FOREIGN PATENT DOCUMENTS

GB    2 337 426 A    11/1999

OTHER PUBLICATIONS

French Preliminary Search Report; European Patent Office; Aug. 29, 2006.
International Search Report, European Patent Office; Jan. 17, 2007.
Xiaofeng, et al.; Intelligent Group Handover Mode in Multicell Infrastructure; IEEE 2003 International Symposium on Personal, Indoor and Mobile Radio Commucation Proceedings; pp. 351-354.

* cited by examiner

*Primary Examiner* — Temica M Beamer
(74) *Attorney, Agent, or Firm* — Miller, Matthias & Hull LLP (57) ABSTRACT

A mobile terminal of a digital cellular radiocommunication system that is in the receiving phase in a group call while roaming in a current cell, indicates to a fixed network element of the system, a given destination cell out of a number N of cells adjacent to the current cell. The system uses a time and/or frequency division multiple access method, and any modulation method. The mobile terminal sends an identification sequence of the destination cell in a time slot of an inbound signaling channel which is a contention channel. The identification sequence comprises a predetermined identification pattern out of a determined number P of identification patterns of different respective values, where P is an integer number such that $1 < P \leq N$. The values of the P identification patterns are such that they correspond to mutually-orthogonal modulated signals.

22 Claims, 4 Drawing Sheets

HANDOVER MANAGEMENT IN GROUP CALLS

This application claims priority from French patent application No. 0510731, filed Oct. 20, 2005, and is the US national stage of the international application No PCI/IB2006/002939, filed Oct. 20, 2006, which are hereby incorporated by reference in their entirety.

FIELD OF THE DISCLOSURE

The present invention relates to handover management for mobile terminals (MT) in the receiving phase in a group call.

BACKGROUND OF THE DISCLOSURE

It finds applications in digital cellular radiocommunication systems. The group calls are provided for, for example, in the ETSI (European Telecommunications Standard Institute) standard concerning the Pan-European GSM Phase 2+ ("Global System for Mobile communications Phase 2+") wireless telephony system. They also constitute a particularly important aspect of professional systems for radiocommunication with mobiles (PMR—"Professional Mobile Radio") such as the TETRA ("Trans European Trunked Radio") system or the TETRAPOL system dedicated in particular to the security forces (police, fire service, etc.), in which these calls are made in half-duplex mode, that is, according to a push-to-talk type communication principle.

Unlike a basic call which concerns only two MTs at most, a group call concerns at least three MTs, no more than one of which is in sending phase (hereinafter, the sending MT) and the others are in receiving phase (hereinafter, the receiving MTs) at a specified instant. The traffic information originating from the sending MT is broadcast by the network in the radio coverage area of the group call, that is, in the cells (a cell being the area of radio coverage by a base station (BS)) in which is located at least one receiving MT involved in the group call. The group call is set up, in a manner known per se, by means of a call setup procedure using Control CHannels (CCH) such as the BCCH ("Broadcast CCH") in GSM. This procedure is used to allocate an inbound traffic channel (TCH) in the cell in which the sending MT is located, and an outbound traffic channel in each cell where at least one receiving MT involved in the group call is located.

It is known that one of the particular features of cellular radiocommunication systems resides in management of the mobility of the MTs, in particular during a call. Handover for an MT roaming from one cell to another is well managed in the case of basic calls, and is widely used in public cellular wireless telephony systems.

It normally relies on a process of preparatory measurements carried out by the MT and/or by the BS, and, furthermore, a frequency change process based on a dialogue between the fixed network and the mobile terminal. This dialogue can be conducted only if an associated signalling channel is permanently open during the call.

In the earliest analogue wireless telephony systems, such a signalling interchange was conducted in the form of inaudible signalling. It can be offered, in the digital wireless telephony systems, in the form of time slots on the carrier frequency of the TCH dedicated to the transmission of signalling outside of the time slots dedicated to the transmission of speech. The recurrence of these signalling time slots on the carrier frequency of the TCH is designated as signalling channel associated with the TCH. This technique, which is perfectly well suited to basic calls, is no longer in the case of the group calls.

In practice, in the case of the GSM Phase 2+ wireless telephony system, for example, only the handover for the sending terminal can be carried out in the group calls because only this terminal can use the inbound signalling channel associated with the inbound traffic channel that is dedicated to it. However, the receiving MTs do not have, in the inbound direction, any dedicated signalling channel that is likely to be used for this purpose. The broadcast transmission of information in the coverage area of the group call allows in practice for a passage of information only from the network to the MTs located in the cells concerned. The receiving MTs that are roaming to other cells and because of this want to proceed with a handover, must use another technique.

The technique currently used in the TETRA system is based on a process of interrupting and reestablishing a call. It has two drawbacks. On the one hand, it can give rise to collective random access phenomena prejudicial to the stability of the system. When a plurality of MTs that are involved in the group call are roaming together (for example, in the case of a group of policemen moving in the same convoy of vehicles), the MTs forming the group decide together to initiate a call re-establishment, so provoking a burst of random access requests prejudicial to the stability of the slotted ALOHA access channel. On the other hand, the response times by the network can be considerable, above all in the case described above, and create a situation that is uncomfortable, if not dangerous, for the users who remain unreachable for a few instants.

Document U.S. Pat. No. 6,292,670 discloses a method for maintaining a group call whereby, in response to the allocation of a traffic channel for the group call in a determined cell, a traffic channel is allocated for the group call in each cell adjacent to said determined cell. When a mobile terminal involved in the group call changes cell from said determined cell to a given adjacent cell, it switches to the traffic channel allocated to the group call in said adjacent cell. This technique does, however, involve a somewhat inefficient use of the radio resources of the system, given that a lot of traffic channels need to be reserved with a very low probability of being used. This waste of radio resources is that much greater when the MTs involved in the group call are not necessarily in the same cell, or in cells adjacent to each other.

SUMMARY OF THE DISCLOSURE

The invention seeks to overcome these drawbacks in the state of the art, by allowing for a handover without interrupting the call, for the receiving terminals involved in a group call in a digital cellular radiocommunication system. More specifically, the invention aims to enable the network element that manages the radio resources assigned to the group call in the system to identify the destination cell of an MT that is involved in the group call and is prepared to make a handover from a current cell to said destination cell. The equipment can then allocate an outbound traffic channel for the group call in that cell, that is, extend to that cell the radio coverage of the group call, in a conventional manner.

To this end, according to a first aspect of the invention, there is proposed a method of indicating, by a mobile terminal of a digital cellular radiocommunication system that is in the receiving phase in a group call while roaming in a current cell, to a fixed network element of said system, a given destination cell out of a number N of cells adjacent to said current cell, in which:

the system uses a time and/or frequency division multiple access method, and any modulation method;

the mobile terminal sends an identification sequence of the destination cell in a time slot of an inbound signalling channel that is a channel with contention;

the identification sequence comprises a determined identification pattern out of a determined number P of identification patterns of different respective values, where P is an integer such that $1<P \leqq N$; and, the values of the P identification patterns are such that they correspond to mutually-orthogonal modulated signals.

A second aspect of the invention relates to a method of identification by a fixed network element of a digital cellular radiocommunication system, of a destination cell indicated by a mobile terminal of said system that is in receiving phase in a group call while roaming in a current cell, said destination cell being defined from a determined number N of cells adjacent to said current cell, in which:

the system uses a time and/or frequency division multiple access method, and any modulation method;

the fixed network receives from the mobile terminal an identification sequence of the destination cell in a time slot of an inbound signalling channel which is a contention channel;

the identification sequence comprises a determined identification pattern out of a determined number P of identification patterns of different respective values $(S_k)$, where P is an integer such that $1<P \leqq N$;

the values of the P identification patterns are such that they correspond to mutually-orthogonal modulated signals; and, the fixed network element recovers the received identification pattern and identifies the destination cell from said identification pattern and said rank.

Preferably, there are also provided the following provisions for one and/or the other of the first and second aspects of the invention:

the identification pattern is included in a temporal subdivision of determined rank of the time slot out of a determined number Q of such temporal subdivisions, where $1<Q<N$ and $P \times Q \geqq N$;

the identification sequence also comprises at least one stuffing pattern, which is included in each of the Q−1 other temporal subdivisions of the time slot;

the values of the P identification patterns and of the stuffing pattern are such that they correspond to mutually-orthogonal modulated signals.

In this case, the fixed network element also determines the rank of the temporal subdivision of the time slot in which the identification pattern is received, and identifies the destination cell from said identification pattern and said rank.

In this way, each identification sequence out of the at least N possible sequences is defined unequivocally by the combination of the value of said identification pattern and of the rank of the subdivision of the time slot that contains it. Advantageously, it may be easier to design P+1 identification patterns having respective mutually-orthogonal values than N such patterns.

Furthermore, the calculations to be done on the receiver side to calculate the intercorrelation between the signal received during each subdivision of the time slot on the one hand, and the P+1 patterns on the other hand, are less intensive. The calculated power required, and also the time needed for the calculations, are therefore correspondingly reduced.

Moreover, on the receiver side, instead of N modulated reference signals, only P+1 reference modulated signals have to be stored, each having an equal duration reduced by Q. This reduces the quantity of memory needed in the receiver.

A third aspect of the invention also relates to a mobile terminal comprising means for executing the steps of the method according to the first aspect.

Finally, a fourth aspect of the invention relates to a fixed network element, such as a base station, comprising means for executing the steps of the method according to the second aspect.

BRIEF DESCRIPTION OF THE DRAWINGS

Other characteristics and advantages of the invention will become apparent on reading the description that follows. This is purely illustrative and should be read in light of the appended drawings, in which.

DETAILED DESCRIPTION OF DISCLOSURE

The invention is described below, as an exemplary embodiment only, in its application to a professional radio communication system operating in second order Time-Division Multiple Access (TDMA) mode, such as the APCO II system. This system uses a Continuous Phase Modulation (CPM). This modulation is subject to a high level of Inter-Symbol Interference (ISI).

It should, however, be clearly understood that the invention also applies to public or professional radiocommunication systems using a Frequency-Division Multiple Access (FDMA) method or a combination of the FDMA and TDMA methods, and another modulation, such as an amplitude modulation (QAM—"Quaternary Amplitude Modulation", or similar) or phase modulation (PSK—"Phase Shift Keying", or similar).

Figure 1:
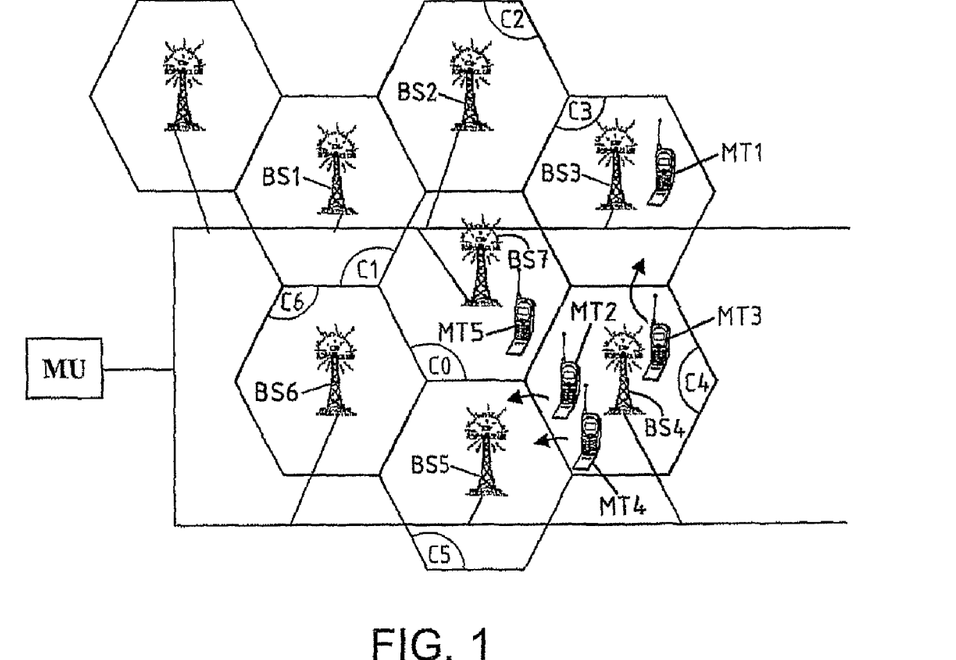
FIG. 1 is a diagram of a digital cellular radiocommunication system illustrating a configuration embodying the invention.

With reference to FIG. 1, the system comprises mobile terminals (or MTs), for example MT1 to MT6, and fixed base stations (or BSs), for example BS1 to BS6. The base stations are linked, by appropriate links, to a management unit MU. The management unit MU is a fixed network element of the system.

Each base station has a predetermined radio coverage area, called a cell. The cells of the base stations BS1 to BS6 are respectively denoted C1 to C6 in the example. The geographic distribution of the base stations BS1 to BS6 and their radio sending and receiving characteristics are such that the cells C1 to C6 are contiguous in pairs with a partial overlap. The overall coverage area of the system then extends to a geographic area that can be over a very wide area.

Depending on the radio engineering, a given cell can have a variable number of adjacent cells, the number of adjacent cells being however, by construction, at most equal to a maximum number N. We will consider here an example in which N=16.

It is considered here that the mobile terminals MT1 to MT6 belong to one and the same group, in the professional radiocommunication sense. They can, for example, belong to policemen of one and the same operational unit. In an example, it is assumed that a current group call is set up between these mobile stations, and that their location with respect to the cells is as represented in the figure: the mobile terminal MT1 is in the cell C3, the mobile terminals MT2, MT3 and MT4 are in the cell C4, and the mobile terminal MT6 is in the cell C1.

For each base station, there is defined, on a particular carrier frequency called beacon frequency, a physical outbound channel sometimes called a beacon path. This beacon path is devoted to the sending of signalling information (also referred to as control information). Symmetrically, a physical inbound channel is defined on another particular frequency for the transmission of signalling information from the mobile terminals to the base station.

These physical signalling channels are subdivided into logical signalling channels by time-division multiplexing. Some of these logical channels are common channels, shared by the mobile terminals located in the corresponding cell. Others are dedicated channels, that the base station uses to communicate with particular mobile terminals. Common logical control channels contain in particular a synchronization pattern formed by a determined sequence of bits. This synchronization pattern makes it possible to synchronize the mobile terminals in frequency and time. Other common logical control channels are used to transmit system information essential to coordination between the mobile terminals and the base station, and/or, in the outbound direction only, messages addressed by the base station to mobile terminals with which it is not already communicating (paging).

Each base station can also set up physical traffic channels, each suitable for communication with an MT (or several MTs in the case of a group call) located in its coverage area (cell), after a setup procedure performed by means of the physical signalling channel of that cell. A physical traffic channel set up with a terminal is outbound (on a carrier frequency fTD) and/or inbound (on a carrier frequency fTU). With regard to an FDMA system, there is a single logical traffic channel set up on each physical traffic channel. The logical traffic channel is, however, multiplexed on the frequency fTD and/or fTU with associated signalling channels used to exchange signalling during a call.

Figure 2:
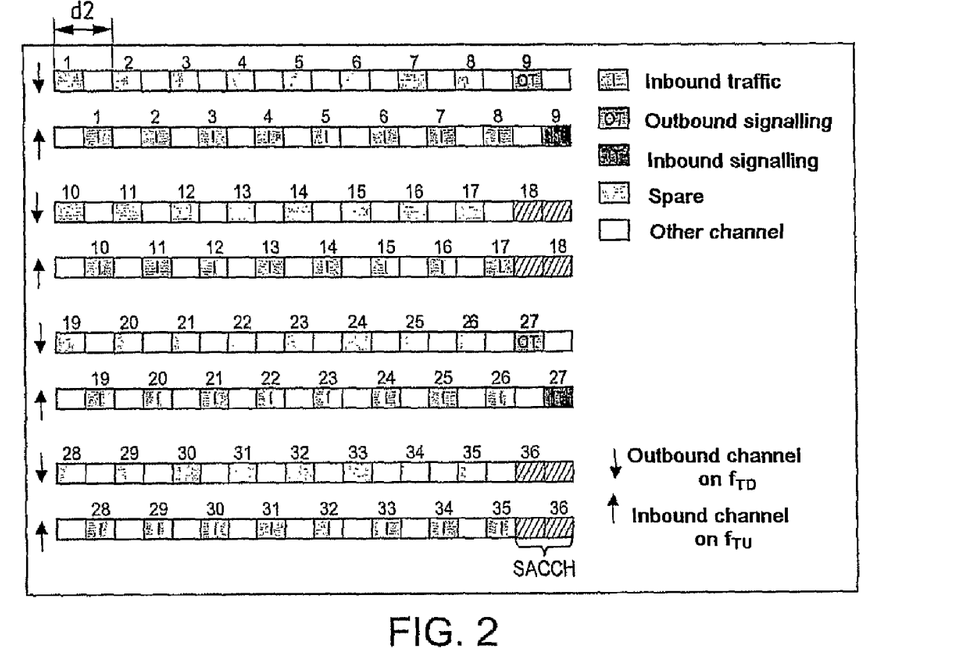
FIG. 2 and FIG. 3 are diagrams illustrating examples of the structure of traffic frames transmitted on traffic carrier frequencies assigned to a half-duplex mode call.
Figure 3:
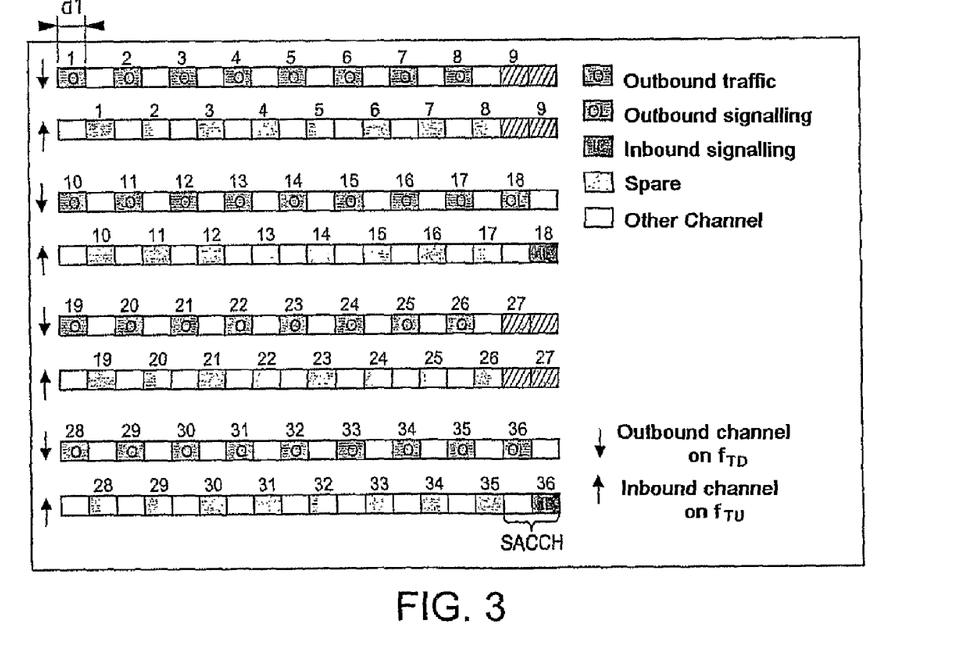

The inbound and outbound logical traffic channels can have the frame structure represented in FIG. 2 and in FIG. 3. Each frame of the traffic channel has a duration corresponding to 36 composite time slots, and is divided into four parts, each of nine composite time slots, represented one on top of the other, in the figures. In each of these four parts, the first eight time slots are occupied by the logical traffic channel, and the ninth time slots of each part form a logical associated signalling channel (SACCH—"Slow Associated Channel"). Each composite time slot has the same duration $d2=40$ ms.

With the frame structure illustrated by FIGS. 2 and 3, time-division duplexing can be used, although the mobile terminals are not capable of modulating and demodulating simultaneously around two carrier frequencies, thanks to a half-duplex type communication mode. To this end, each composite time slot is divided into two basic time slots. For a given call, the first basic time slot is assigned to the transmission of a radio burst on the outbound path and the second to the transmission of a radio burst on the inbound path. Each basic time slot has the same duration $d1=20$ ms. This example therefore shows a time-division duplexing based on the second order TDMA principle.

In FIGS. 2 and 3, the basic time slots forming the inbound logical traffic channel and the outbound logical traffic channel respectively, are identified by the letter "I" or the letter "O", respectively.

On the carrier frequency fTU (FIG. 2), the ninth time slot is occupied by associated control channels for the first and third parts of the frame, and unoccupied for the second and fourth parts. Conversely, on the carrier frequency fTD (FIG. 3), it is the ninth time slot of the second and fourth parts of the frame that is occupied by associated logical control channels, the ninth time slot being unoccupied for the first and third parts of the frame. These unoccupied time slots, which are shown shaded in FIG. 2 and FIG. 3, form a scanning window during which the mobile terminal, sending or receiving, respectively, changes frequency to observe the physical control channels of the base stations of the adjacent cells, in order to be able to decide whether a change of cell is necessary.

In other words, in the scanning window of a traffic frame, the mobile terminal seeks to detect the synchronization pattern of the control frame sent by the base station of an adjacent cell. If this information is better received than the corresponding information sent by the BS of the current cell, the mobile terminal decides to change cell.

There now follows a detailed description of the structure of the signalling channels associated with the traffic channels, that are set up on the same carrier frequencies.

When the base station is listening to what the mobile terminal is sending on the carrier frequency fTU, it has a time slot belonging to an associated logical signalling channel, denoted OT ("Outbound Talker"), at the end of the first and the third parts of each frame on the carrier frequency fTD (FIG. 2). The OT channel carries the outbound signalling which can in particular relate to the control of the sending power by the mobile terminal (power measurements performed by the base station and used by the terminal in sending phase to regulate its power so as to limit interference throughout the radio spectrum), to the call indications concerning the terminal in sending phase, or even to commands to cease transmission (for example, if the traffic channel is pre-empted by a higher priority terminal or call).

When the base station is sending to a mobile terminal on the carrier frequency fTD, it has a time slot belonging to an associated logical signalling channel, denoted OL ("Outbound Listener"), at the end of the first and the third parts of each frame on the carrier fTD (FIG. 3). The OL channel carries the outbound signalling which can, in particular, relate to the identification (colour codes) of the adjacent cells in which the group call is set up (enabling the receiving terminals to choose a new cell if the reception conditions are degraded), to information concerning the terminal in sending phase, or even to the identity of the listener or to parameters used to decipher signals transmitted on the traffic channel.

When the terminal channel is listening to what the base station is sending on the carrier frequency fTD, it has a time slot belonging to an associated logical signalling channel, denoted IL ("Inbound Listener"), at the end of the second and the fourth parts of each frame on the carrier frequency fTU (FIG. 3). The IL channel carries the inbound signalling which can, in particular, relate to random accesses from the terminal to request the right to talk, or even to responses to requests made by the base station (on the OL logical channel) to check the presence of the mobile terminals.

When the mobile terminal is sending to a base station on the carrier fTU, it has a time slot belonging to an associated logical signalling channel, denoted IT ("Inbound Talker"), at the end of the first and the third parts of each frame on the carrier frequency fTU (FIG. 2). The IT channel carries the inbound signalling which can, in particular, relate to cell changeover requests if the terminal observes a degradation of the radio conditions in the measurements sent by the base station on the OT logical channel or those made by the terminal, or even a request to change transmission type (for example from speech to data).

In each basic time slot of each channel, hereinafter simply called time slot (such a time slot being the basic unit of frequency and/or time managed by the system for the transmission of information according to the access method concerned), a radio burst is transmitted. This comprises a number L of modulated symbols, for example L=160 symbols, transmitted with a symbol rate 1/Ts equal to 8000 symbols/s, for example. With such a rate, the symbol transmission time Ts is equal to 125 μs. The present example is based on binary symbols ±1, or bits. However, they can be M-aires symbols ±1, . . . , $$\pm \frac{M-1}{2},$$

where M is an integer strictly greater than unity (M>1).

The object and the result of the setting up of a group call is the allocation of channels in each cell in which at least one mobile terminal of the group is located. These channels comprise:

an outbound traffic channel, for the transmission of traffic information (i.e., speech information encoding voice and/or data) from the base station to the mobile terminals that are located in the cell;

at least one associated outbound signalling channel, for the transmission of signalling information from the base station to the mobile terminals that are located in the cell;

an inbound traffic channel, for the transmission of traffic information from a sending mobile terminal that is located in the cell to the base station; and, at least one associated inbound signalling channel, for the transmission of signalling information from the receiving mobile terminals that are located in the cell to the base station. The case of an inbound signalling channel which is a contention channel is considered here. A contention channel should be understood to mean a channel that is accessible concurrently by all the mobile terminals in receiving phase involved in the group call that are present in the cell, that is, served by the base station of the cell.

In the context of a group call, several MTs roaming in the same cell at a determined instant may need to perform a handover to cells adjacent to the cell in which they are located. In the configuration represented in FIG. 1, for example, the mobile terminal MT3 must thus switch from the cell C4 to the cell C3, and the mobile terminals MT2 and MT4 must switch from the cell C4 to the cell C5.

In the embodiments envisaged here, the need to perform a handover is determined on the mobile terminals, based on the results of the radio power measurements of the beacon signals received from the base stations of the adjacent cells, these measurements being performed during the scanning windows (see above). The description of the procedure leading to the decision that a handover is necessary and to the choice of the destination cell, known per se, does not fall within the scope of the present explanation.

It is simply reviewed here that, in an embodiment, the list of the cells belonging to the radio coverage of the group call, and the identification elements of the physical channels assigned to the group call in each of these cells, are permanently broadcast to the MTs by the network, via the SACCH channel to the MTs, and more particularly via the OL channel.

Thus, when the destination cell for the handover of a determined MT is already part of the coverage of the group call, the mobile terminal has all the information it needs to perform the handover. No signalling interchange with the base station of the current cell is therefore needed. In the configuration of FIG. 1, this is the case, for example, for the mobile terminal MT3. In practice, this terminal must perform a handover from the cell C4 to the cell C3, which cell C3 already belongs to the radio coverage of the group call since the mobile terminal MT1 is already located in that cell.

However, when, conversely, the destination cell does not belong to the radio coverage of the current group call, the MT concerned must indicate to the network, via the base station of the current cell, the desired destination cell. This is so that the network can allocate radio resources for the group call also in that destination cell. It will be noted that the management resources of the group call use a frequency auditing mechanism, to "deallocate" (release) the radio resources that were allocated to the group call in the cells in which it is identified that there are no longer mobile terminals involved in the group call. The description of this mechanism, known per se, does not fall within the scope of the present description.

When a handover to a cell that does not already belong to the radio coverage of the group call is required, the mobile terminal concerned sends to the base station of the current cell an identification pattern, the ID value of which, for example between 0 and N−1, enables the network to identify unequivocally the desired destination cell. In the case of the sending MT, it can use the IT channel for this purpose. If it is a receiving MT, it can use the IL channel for this purpose. The latter is a contention channel, according to the meaning described above, which means that it is shared by all the receiving mobile terminals located in the cell.

Bearing in mind that there are, in the example considered here, at most N=16 adjacent cells for each cell of the network, the identification pattern can be encoded on just 4 bits.

To send the synchronization pattern, the receiving mobile terminals use a subchannel of the IL channel, that is, only certain time slots of this IL channel. The network broadcasts in each cell, via the BS of that cell, information enabling the receiving mobile terminals to know which is the next time slot of the IL channel in which they are allowed, if necessary, to send the identification pattern of their destination cell.

In an embodiment, this broadcast can take place within an outbound signalling channel arranged simultaneously with the power ramp-ups and ramp-downs of each radio burst on the inbound transmission channel. This channel is called Associated Access CHannel (AACH). The AACH logical channels are set up in the part of the outbound signals located between two (basic) time slots. This part is the one reserved for the power ramp-ups and ramp-downs for the (basic) time slots on the inbound physical channel. Since the base station sends continuously, there is no need for power ramp-up or ramp-down, as is the case conversely for the mobile terminals because of the time-division duplexing using the second order TDMA principle. This part is therefore available for the BS. In an example, an AACH field has a fixed length of 4 bits.

A particular problem arises when a number of receiving MTs simultaneously need to perform a handover, such that they simultaneously send the identification pattern of a destination cell in a burst on the IL channel. If it is the same destination cell for all the MTs, the identification patterns sent are the same.

In practice, such a case can occur, for example, when a plurality of police vehicles (forming respective MTs) involved in one and the same group call are located at different places in one and the same current cell and converge towards one and the same place located in a cell that is adjacent to said current cell. The radio signals transmitted may, nevertheless, be affected by different respective group delays and Doppler frequencies.

Another example is the case of a bus transporting a squad of policemen, several of them using their mobile terminal to take part in one and the same group call. Such a case is less critical than the preceding case because, since the mobile terminals are the same distance from the BS and travelling at the same speed, the signals that they transmit are affected by the same group delay and the same Doppler frequency, respectively.

However, the destination cells may also be different, such that the identification patterns sent are different.

In all the cases described above, a collision occurs between the radio signals sent concurrently in the same time slot of the IL channel. In other words, in cases where a plurality of receiving mobile terminals need to perform a handover, there is a collision between the identification patterns sent concomitantly by these mobile terminals. All the MTs are, in practice, synchronized with the network clock, such that the MTs of one and the same cell that have to send the identification pattern of their destination cell, do so at the same time in the same time slot of the IL channel set up on the same carrier frequency fTU.

In order to solve the problem of these collisions, it is proposed to choose the identification patterns of the different possible adjacent cells so that they have respective values corresponding to mutually-orthogonal modulated signals. This means that the N identifiers are chosen as N sequences of bits, each of length L (the length being expressed as a number of bits), giving, when modulated, signals that are orthogonal in pairs (that is, each with all the others). By incorrect usage, it is sometimes stated below that the identification patterns of the adjacent cells are mutually orthogonal, although this orthogonality in fact relates to the modulated signals corresponding to these identification patterns.

The orthogonality between the N=16 identification patterns can be defined by the following relation:

$$\int_{t=0}^{L \times T_S} ref_i(t) \cdot ref_j^*(t) \, dt \approx 0 \text{ for } i \neq j \quad (1)$$

and for each $(i, j) \in \{1, 2, 3, \ldots, 16\}$ where $ref_i(t)$ denotes the modulated signal at the instant t, corresponding to the identification pattern of index i, with i between 1 and N;

where $ref_j^*(t)$ denotes the modulated signal at the instant t, corresponding to the identification pattern of index j, with j between 1 and N; and where $L \times T_s$ corresponds to the transmission time of the L binary symbols (bits) of an identification pattern, with a symbol rate equal to 1/Ts.

Nevertheless, each MT does not present the same group delay between itself and the BS, this delay being mainly dependent on the distance between the MT and the BS, but also on the radio propagation conditions. This is why, in the embodiments, it is preferable to choose the bit sequences corresponding to the identification patterns of the adjacent cells such that the corresponding modulated signals present between themselves low intercorrelation values.

In other words, the orthogonality of the identification patterns of the cells adjacent to the current cell is preferably defined using the concept of intercorrelation between the modulated signals corresponding to these sequences.

It should be remembered that the intercorrelation $corr_{i,j}$ between the two signals $ref_i$ and $ref_j$ can be given by the relation:

$$corr_{i,j}(\tau) = \int_{t=0}^{L \times T_S} ref_i(t) \cdot ref_j^*(t + \tau) \, dt \approx 0 \quad (2)$$

where $ref_i(t)$ denotes the modulated signal at the instant t, corresponding to the identification pattern of index i, with i between 1 and N;

where $ref_j(t)$ denotes the modulated signal at the instant t, corresponding to the identification pattern of index j, with j between 1 and N;

where $L \times T_s$ corresponds to the transmission time of the L binary symbols (bits) of an identification pattern, with a symbol rate equal to 1/Ts; and, where $\tau \in [0, Tp]$, where Tp is the maximum relative group delay between the signals output by all the senders (in an example, it is considered that Tp is equal to a symbol time Ts).

Thus, there are used N patterns or sequences of bits $S_k$ with $k \in \{1, \ldots, N\}$ which are mutually orthogonal, in the sense, for example, that the N corresponding modulated signals present between themselves a low intercorrelation. This aim can be achieved with relatively lengthy bit sequences. To detect a sequence it is then necessary, on the receiver side, to filter the received signal with N stored signals corresponding to these N modulated sequences, respectively.

It will be noted that the intercorrelation $Corr_{i,j}$ between a received modulated signal and a stored modulated signal respectively corresponding to different identification patterns $S_i$ and $S_j$ (with $i \neq j$), is said to be low in as much as it is below a threshold, which can, for example, be equal to 10 dB, the intercorrelation $Corr_{i,i}$ between a received modulated signal and the stored modulated signal both corresponding to any one of the separate identification patterns $S_i$.

Figure 4:
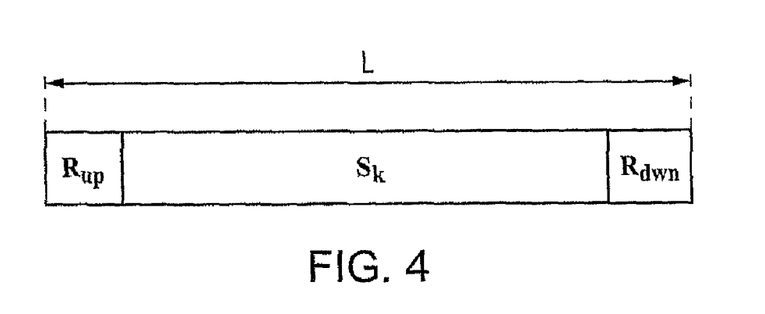
FIG. 4 and FIG. 5 are diagrams of an exemplary identification sequence sent in a time slot according to different embodiments of the present invention.

With reference to FIG. 4, the identification sequence that is transmitted in the time slot of the IL channel provided for this purpose begins with a ramp-up pattern $R_{up}$ and ends with a ramp-down pattern $R_{dwn}$, each encoded on a few bits, for example 5 bits.

Furthermore, the identification sequence comprises a determined identification pattern $S_k$ out of P identification patterns $S_1$ to $S_P$, where P is equal to N (P=N). The values of the identification patterns $S_1$ to $S_P$ are equal to the different values of the ID parameter, namely 1 to N, respectively. The pattern $S_k$ is encoded on a number of bits $L_Q$ corresponding to the number of bits L of a burst minus the bits corresponding to the ramp patterns $R_{up}$ and $R_{dwn}$. Thus, in the example considered here, $L_Q$ is equal to 160−2×5=150.

The right-hand column in the table I below describes the content of the identification sequence transmitted in the time slot of the IL channel, according to the different values of the ID parameter, for N=16.

TABLE I

| P | $L_Q$ | ID | Identification pattern |
|---|---|---|---|
| 16 | 150 | 0 | $R_{up} S_1 R_{dwn}$ |
|  |  | 1 | $R_{up} S_2 R_{dwn}$ |

TABLE I-continued

| P | $L_Q$ | ID | Identification pattern |
|---|---|---|---|
|  |  | 2 | $R_{up} S_3 R_{dwn}$ |
|  |  | 3 | $R_{up} S_4 R_{dwn}$ |
|  |  | 4 | $R_{up} S_5 R_{dwn}$ |
|  |  | 5 | $R_{up} S_6 R_{dwn}$ |
|  |  | 6 | $R_{up} S_7 R_{dwn}$ |
|  |  | 7 | $R_{up} S_8 R_{dwn}$ |
|  |  | 8 | $R_{up} S_9 R_{dwn}$ |
|  |  | 9 | $R_{up} S_{10} R_{dwn}$ |
|  |  | 10 | $R_{up} S_{11} R_{dwn}$ |
|  |  | 11 | $R_{up} S_{12} R_{dwn}$ |
|  |  | 12 | $R_{up} S_{13} R_{dwn}$ |
|  |  | 13 | $R_{up} S_{14} R_{dwn}$ |
|  |  | 14 | $R_{up} S_{15} R_{dwn}$ |
|  |  | 15 | $R_{up} S_{16} R_{dwn}$ |

This technique gives good results in practice, but can, however, involve some difficulties.

Firstly, it requires a relatively large quantity of calculations on the receiver side, i.e., calculations of intercorrelation between the received signal and N reference signals corresponding to relatively long sequences, of $L_Q$=150 bits in the example. Then, it involves defining N=16 sequences of at most $L_Q$=150 bits giving corresponding modulated signals that represent between themselves a low intercorrelation, while such a number of such sequences can be difficult to find.

This is why, in embodiments, each time slot of the IL subchannel used for the transmission by the receiving mobile terminals of the identification pattern of their desired destination cell can be subdivided, into a number Q of time sub-slots, where Q is an integer number strictly greater than unity (Q>1). The term "time sub-slot" is used to mean a temporal subdivision of a time slot. In a determined one of these Q temporal subdivisions of the time slot of the IL channel provided for this purpose, an identification pattern $S_k$ is transmitted which is of a size divided by approximately Q, but the separate values of which number P also reduced by approximately Q, compared to the generic case in which the time slot is not subdivided (corresponding to the embodiment described above).

Figure 5:
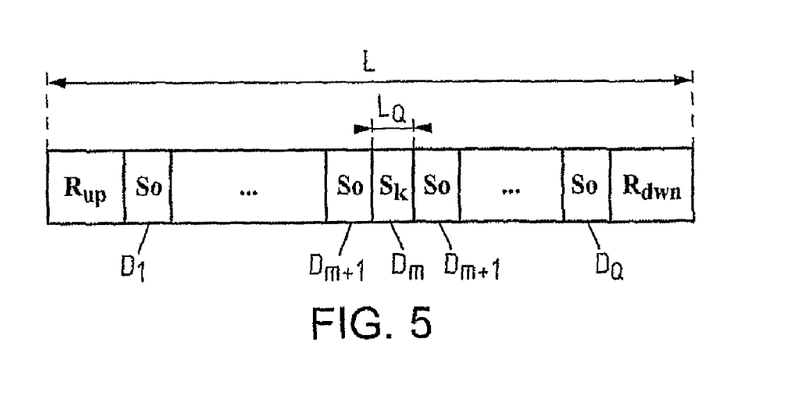

With reference to FIG. 5, the identification sequence that is transmitted in the time slot of the IL channel provided for this purpose still comprises a determined identification pattern $S_k$ out of P identification patterns of different respective values $S_1$ to $S_P$. However, this pattern $S_k$ is in this case included in a temporal subdivision $D_m$ of determined rank m of the time slot, out of a determined number Q of such subdivisions $D_1$ to $D_Q$, where $1 < P \leq N$, $1 < Q \leq N$ and $P \times Q \geq N$. The method is optimized when $P \times Q = N$, because this makes it possible to use the minimum number of different identification patterns $S_k$ each having a length $L_Q$ which is maximum, such that it is easier to find appropriate values for the identification patterns $S_k$.

The identification sequence also comprises at least one stuffing pattern, denoted $S_0$, which is included in each of the Q−1 other temporal subdivisions of the time slot. This pattern is considered to be neutral, inasmuch as it does not correspond to the identification of any one of the adjacent cells.

The values $S_1$ to $S_P$ of the P identification patterns and of the stuffing pattern $S_0$ are mutually orthogonal, that is, one relative to all the others, that is, again, that each is orthogonal to all the others. The concept of orthogonality described here is that which corresponds to the definition given above using the relation (1) or, preferably, the definition given using the relation (2).

Here too, the identification sequence begins with the ramp-up pattern $R_{up}$, and ends with the ramp-down pattern $R_{dwn}$, each encoded on a few bits, for example 4 to 8 bits depending on the embodiments.

In embodiments, the number Q of subdivisions of the time slot is equal to 2, 4 or 8, when N is equal to 16. The number P of different values of the identification pattern $S_k$ is then equal to 8, 4 or 2, respectively. In other words, for a maximum number N of adjacent cells equal to 16, the value of the pair (Q,P) is preferably included in the set of pairs {(2,8),(4,4),(8,2)}. Other pairs are, of course, possible, but they are sub-optimal.

Table II below illustrates the example where the pair (Q,P) is equal to (2,8). In this example, the ramp patterns $R_{up}$ and $R_{dwn}$ have a length of 5 bits each, with $L_Q$=75.

TABLE II

| Q | P | $L_Q$ | ID | Identification sequence |
|---|---|---|---|---|
| 2 | 8 | 75 | 0 | $R_{up} S_1 S_0 R_{dwn}$ |
|  |  |  | 1 | $R_{up} S_2 S_0 R_{dwn}$ |
|  |  |  | 2 | $R_{up} S_3 S_0 R_{dwn}$ |
|  |  |  | 3 | $R_{up} S_4 S_0 R_{dwn}$ |
|  |  |  | 4 | $R_{up} S_5 S_0 R_{dwn}$ |
|  |  |  | 5 | $R_{up} S_6 S_0 R_{dwn}$ |
|  |  |  | 6 | $R_{up} S_7 S_0 R_{dwn}$ |
|  |  |  | 7 | $R_{up} S_8 S_0 R_{dwn}$ |
|  |  |  | 8 | $R_{up} S_0 S_1 R_{dwn}$ |
|  |  |  | 9 | $R_{up} S_0 S_2 R_{dwn}$ |
|  |  |  | 10 | $R_{up} S_0 S_3 R_{dwn}$ |
|  |  |  | 11 | $R_{up} S_0 S_4 R_{dwn}$ |
|  |  |  | 12 | $R_{up} S_0 S_5 R_{dwn}$ |
|  |  |  | 13 | $R_{up} S_0 S_6 R_{dwn}$ |
|  |  |  | 14 | $R_{up} S_0 S_7 R_{dwn}$ |
|  |  |  | 15 | $R_{up} S_0 S_8 R_{dwn}$ |

Table III below illustrates the example in which the pair (Q,P) is equal to (4,4). In this example, the ramp patterns $R_{up}$ and $R_{dwn}$ each have a length of 6 bits, with $L_Q$=37.

TABLE III

| Q | P | $L_Q$ | ID | Identification sequence |
|---|---|---|---|---|
| 4 | 4 | 37 | 0 | $R_{up} S_1 S_0 S_0 S_0 R_{dwn}$ |
|  |  |  | 1 | $R_{up} S_2 S_0 S_0 S_0 R_{dwn}$ |
|  |  |  | 2 | $R_{up} S_3 S_0 S_0 S_0 R_{dwn}$ |
|  |  |  | 3 | $R_{up} S_4 S_0 S_0 S_0 R_{dwn}$ |
|  |  |  | 4 | $R_{up} S_0 S_1 S_0 S_0 R_{dwn}$ |
|  |  |  | 5 | $R_{up} S_0 S_2 S_0 S_0 R_{dwn}$ |
|  |  |  | 6 | $R_{up} S_0 S_3 S_0 S_0 R_{dwn}$ |
|  |  |  | 7 | $R_{up} S_0 S_4 S_0 S_0 R_{dwn}$ |
|  |  |  | 8 | $R_{up} S_0 S_0 S_1 S_0 R_{dwn}$ |
|  |  |  | 9 | $R_{up} S_0 S_0 S_2 S_0 R_{dwn}$ |
|  |  |  | 10 | $R_{up} S_0 S_0 S_3 S_0 R_{dwn}$ |
|  |  |  | 11 | $R_{up} S_0 S_0 S_4 S_0 R_{dwn}$ |
|  |  |  | 12 | $R_{up} S_0 S_0 S_0 S_1 R_{dwn}$ |
|  |  |  | 13 | $R_{up} S_0 S_0 S_0 S_2 R_{dwn}$ |
|  |  |  | 14 | $R_{up} S_0 S_0 S_0 S_3 R_{dwn}$ |
|  |  |  | 15 | $R_{up} S_0 S_0 S_0 S_4 R_{dwn}$ |

Finally, Table IV below illustrates the example in which the pair (Q,P) is equal to (8,2). In this example, the ramp patterns $R_{up}$ and $R_{dwn}$ each have a length of 8 bits, with $L_Q$=18.

TABLE IV

| Q | P | $L_Q$ | ID | Identification sequence |
|---|---|---|---|---|
| 8 | 2 | 18 | 0 | $R_{up} S_1 S_0 S_0 S_0 S_0 S_0 S_0 S_0 R_{dwn}$ |
|  |  |  | 1 | $R_{up} S_2 S_0 S_0 S_0 S_0 S_0 S_0 S_0 R_{dwn}$ |
|  |  |  | 2 | $R_{up} S_0 S_1 S_0 S_0 S_0 S_0 S_0 S_0 R_{dwn}$ |
|  |  |  | 3 | $R_{up} S_0 S_2 S_0 S_0 S_0 S_0 S_0 S_0 R_{dwn}$ |

TABLE IV-continued

| Q | P | $L_Q$ | ID | Identification sequence |
|---|---|---|---|---|
|  |  |  | 4 | $R_{up} S_0 S_0 S_1 S_0 S_0 S_0 S_0 S_0 R_{dwn}$ |
|  |  |  | 5 | $R_{up} S_0 S_0 S_2 S_0 S_0 S_0 S_0 S_0 R_{dwn}$ |
|  |  |  | 6 | $R_{up} S_0 S_0 S_0 S_1 S_0 S_0 S_0 S_0 R_{dwn}$ |
|  |  |  | 7 | $R_{up} S_0 S_0 S_0 S_2 S_0 S_0 S_0 S_0 R_{dwn}$ |
|  |  |  | 8 | $R_{up} S_0 S_0 S_0 S_0 S_1 S_0 S_0 S_0 R_{dwn}$ |
|  |  |  | 9 | $R_{up} S_0 S_0 S_0 S_0 S_2 S_0 S_0 S_0 R_{dwn}$ |
|  |  |  | 10 | $R_{up} S_0 S_0 S_0 S_0 S_0 S_1 S_0 S_0 R_{dwn}$ |
|  |  |  | 11 | $R_{up} S_0 S_0 S_0 S_0 S_0 S_2 S_0 S_0 R_{dwn}$ |
|  |  |  | 12 | $R_{up} S_0 S_0 S_0 S_0 S_0 S_0 S_1 S_0 R_{dwn}$ |
|  |  |  | 13 | $R_{up} S_0 S_0 S_0 S_0 S_0 S_0 S_2 S_0 R_{dwn}$ |
|  |  |  | 14 | $R_{up} S_0 S_0 S_0 S_0 S_0 S_0 S_0 S_1 R_{dwn}$ |
|  |  |  | 15 | $R_{up} S_0 S_0 S_0 S_0 S_0 S_0 S_0 S_2 R_{dwn}$ |

Figure 6:
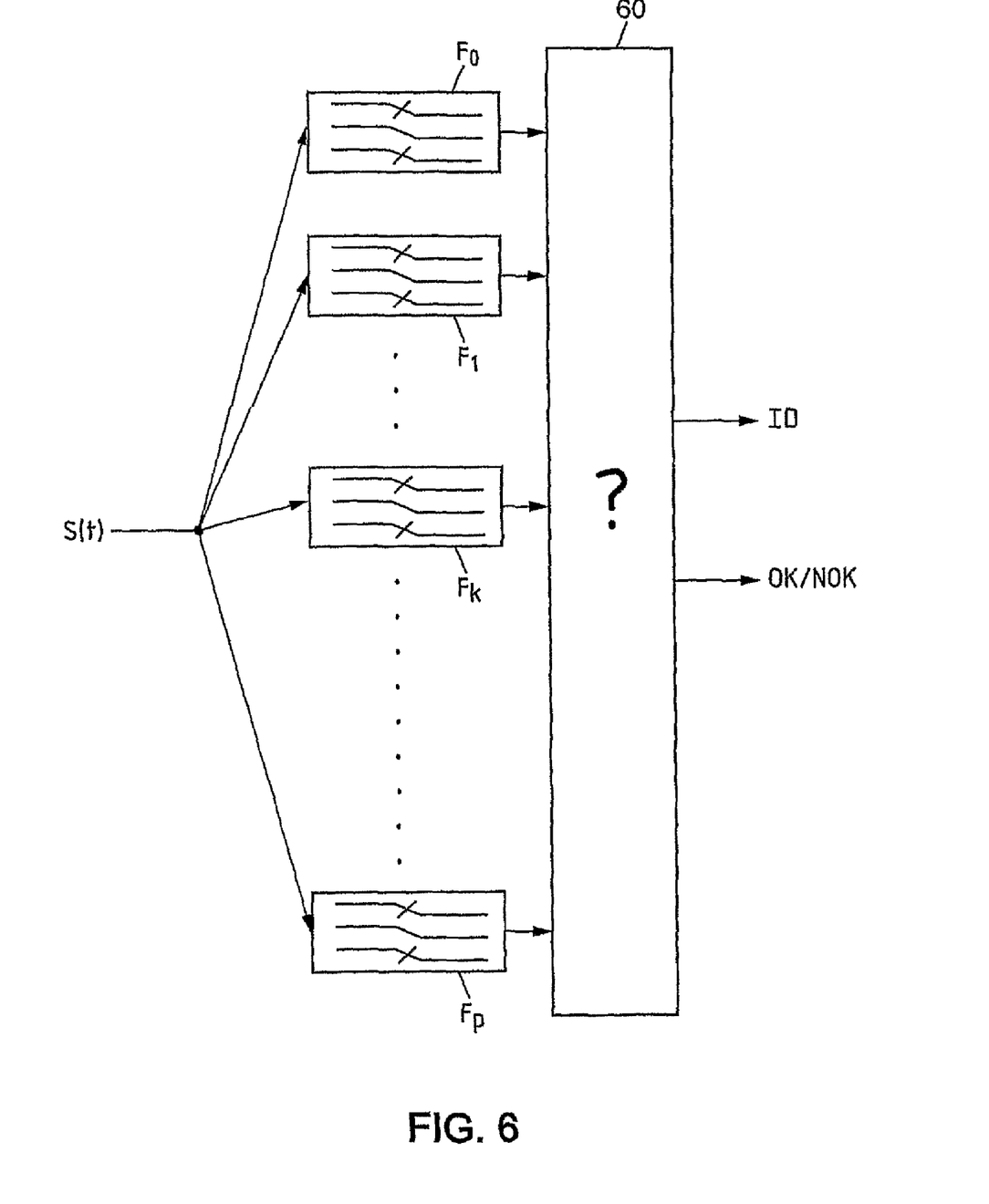
FIG. 6 is a diagram of a device for implementing the method according to the second aspect of the invention; and, FIGS. 7 and 8 are diagrams of steps illustrating exemplary methods according to the first and second aspects of the invention, respectively.

With reference to FIG. 6, a device for implementing the method of identification in the base stations of the system comprises a bank of P+1 filters, respectively $F_0$ to $F_P$. These filters receive a modulated signal S(t) originating from the receive antenna, via a radio reception subsystem comprising at least one amplifier and one ad-hoc receive filter. The filters $F_0$ to $F_P$ are synchronized with the system clock, and process the portions of the signal S(t) corresponding to the time slots of the IL channel dedicated to the transmission of the identification sequence of the destination cell for the handovers.

For example, the filter F0 is configured to calculate the intercorrelation between such a portion of the signal S(t) and a reference signal $Ref_0(t)$ corresponding to the neutral pattern $S_0$, saved in memory. Similarly, the filters $F_1$ to $F_P$ are configured to calculate the intercorrelation between such a portion of the signal S(t) and of the reference signals $Ref_k(t)$, for $1 \leq k \leq P$, corresponding to the identification patterns of the adjacent cells, respectively $S_1$ to $S_P$, these signals also being saved in memory.

In the embodiments in which the identification sequence conforms to FIG. 5, the signal portions processed, respectively saved, correspond not to the signal received during the entire time slot, but during a temporal subdivision of this time slot.

The intercorrelation measurements supplied by the filters $F_0$ to $F_P$ are transmitted to a decision unit 60. The latter is configured to decide which identification pattern $S_1$ to $S_P$ has been sent, and, where appropriate, in which subdivision $D_1$ to $D_Q$ of the time slot it has been sent, and to deduce from this the value of the identification parameter ID of the destination adjacent cell. This value is then used, by means that are not represented, to assign radio resources to the group call in the corresponding destination cell. The unit 60 can also be configured to set an OK/NOK signal, when an identification pattern has validly been identified, for example when the difference between the greatest intercorrelation value received and all the others is greater than a determined threshold, for example 10 dB. This enables the above-mentioned resource allocation means not to allocate resources to the group call without a certain degree of detection reliability.

In the embodiments in which the identification sequence conforms to FIG. 4, the mobile terminal sends the pattern $S_k$, with k=ID+1. In correlation, the decision unit 60 of the base station having identified that the identification pattern $S_k$ has been sent by a mobile terminal, delivers the value ID=k−1.

In the embodiments in which the identification sequence conforms to FIG. 5, the algorithm of the methods implemented is a little more complicated.

Figure 7:
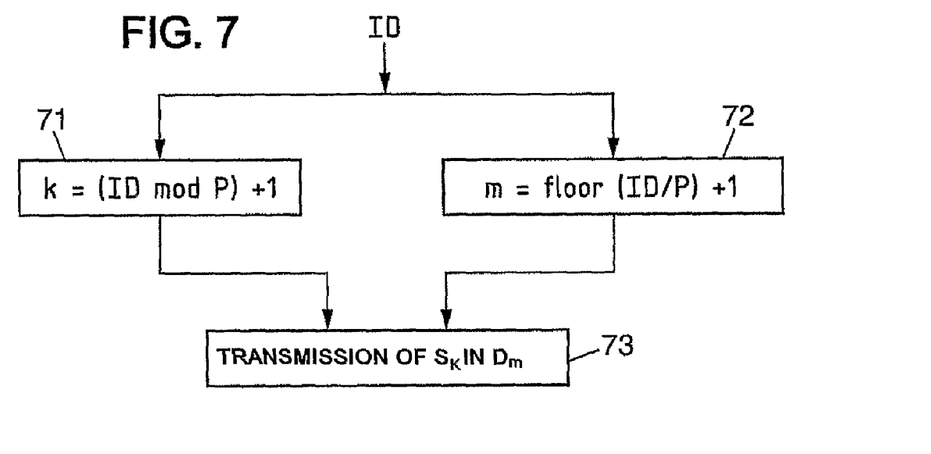

With reference to FIG. 7, embodiments of the method of indicating the destination cell that is implemented in the mobile terminals comprise the following steps.

In a step 71, the index k is determined from the value of the ID parameter, which is between 0 and N−1. The index k is given by the relation:

$$k = (ID \bmod P) + 1 \quad (3)$$

where "mod" denotes the modulo function.

In a step 72, the index m is determined from the value of the ID parameter. The index m is given by the relation:

$$m = \text{floor}(ID/P) + 1 \quad (4)$$

where "floor" denotes the floor function, which gives the integer value just below the value supplied as an argument.

In a step 73, the mobile terminal then sends the identification pattern $S_k$ in the temporal subdivision $D_m$ in the time slot of the IL channel provided for this purpose.

Figure 8:
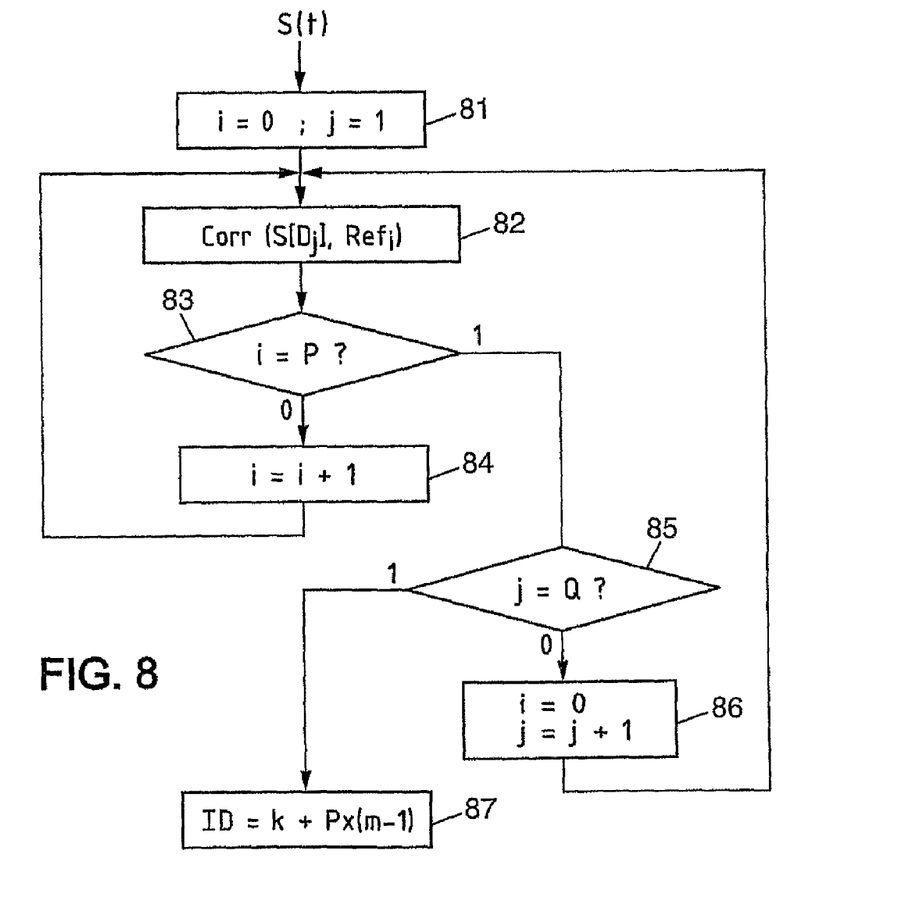

With reference to FIG. 8, embodiments of the identification method implemented in the base stations comprise the following steps.

In a step 81, an index i is set to a zero value (i=0) and an index j to the unity value (j=1).

In a step 82, the intercorrelation value $\text{Corr}(S[D_j], Ref_i)$ is then calculated between, on the one hand, a portion of the modulated signal S(t) that has been received in the time slot of the IL channel provided for this purpose, which portion corresponds to the temporal subdivision $D_j$ of said time slot, and, on the other hand, a modulated signal $Ref_i$ stored in memory and corresponding to the identification pattern $S_i$. This calculation is performed by the filter $F_i$ of FIG. 6.

In a step 83, a check is carried out to ensure that, for the current subdivision $D_j$, the intercorrelation calculations have been carried out for all the patterns $S_i$ with $0 \leq i \leq P$.

If not, the index i is incremented in a step 84, and there is a return to the step 82. Otherwise, a step 85 is applied to find out whether the intercorrelation calculations have been performed for all the subdivisions $D_j$ with $1 \leq j \leq Q$.

If not, then in a step 86, the index i is reset (i is set to 0) and the index j is incremented, then there is a return to 82. Otherwise, the value of the ID parameter is calculated in a final step 87.

The step 87 is applied by the detection unit 60 of FIG. 6, based on all the intercorrelation values calculated. The ID value is given by the following relation:

$$ID = k + P \times (m-1) \quad (4)$$

where k and m respectively denote the values of the index of the identification pattern $S_i$ with $1 \leq i \leq P$ and the index of the subdivision $D_j$ with $1 \leq j \leq Q$, which give the highest intercorrelation value and for which the decision unit 60 sets the OK/NOK signal.

The invention has been described above within the context of embodiments only, and those skilled in the art will understand that this description does not limit the scope of its technical teaching.

In particular, in the embodiments described, the inbound signalling channel, in a time slot of which the identification sequence is sent, is the IL channel which is an associated signalling channel, set up in the current cell on the outbound traffic carrier frequency $f_{TD}$, but other inbound signalling channels that would be channels in contention can be considered.

The invention claimed is:

1. A method of indicating, by a mobile terminal of a digital cellular radiocommunication system that is in receiving phase in a group call while roaming in a current cell, to a fixed network element of said system, a given destination cell out of a number N of cells adjacent to said current cell, wherein:

the system uses a time and/or frequency division multiple access method, and any modulation method;

the mobile terminal sends an identification sequence of the destination cell in a time slot of an inbound signalling channel that is a channel with contention;

the identification sequence comprises a determined identification pattern out of a determined number P of identification patterns of different respective values, where P is an integer such that 1<P≦N; and, the values of the P identification patterns are such that they correspond to mutually-orthogonal modulated signals.

2. The method according to claim 1, wherein:

the identification pattern is included in a temporal subdivision of determined rank of the time slot out of a determined number Q of such temporal subdivisions, where 1<Q<N and P×Q≧N;

the identification sequence also comprises at least one stuffing pattern, which is included in each of the Q−1 other temporal subdivisions of the time slot;

the values of the P identification patterns and of the stuffing pattern are such that they correspond to mutually-orthogonal modulated signals.

3. The method according to claim 2, wherein and wherein the value of the pair (Q,P) is included in the set of pairs {(2,8),(4,4),(8,2)}.

4. The method according to claim 1, wherein the values of the P identification patterns and, where appropriate, the value of a stuffing pattern, are such that they correspond to modulated signals having a low mutual inter correlation.

5. The method according to claim 1, wherein the inbound signalling channel is an associated signalling channel, set up in the current cell on an outbound traffic carrier frequency.

6. A method of identification by a fixed network element of a digital cellular radiocommunication system, of a destination cell indicated by a mobile terminal of said system that is in receiving phase in a group call while roaming in a current cell, said destination cell being defined from a determined number N of cells adjacent to said current cell, wherein:

the system uses a time and/or frequency division multiple access method, and any modulation method;

the fixed network receives from the mobile terminal an identification sequence of the destination cell in a time slot of an inbound signalling channel which is a contention channel;

the identification sequence comprises a determined identification pattern out of a determined number P of identification patterns of different respective values, where P is an integer such that 1<P≦N;

the values of the P identification patterns are such that they correspond to mutually-orthogonal modulated signals; and, the fixed network element recovers the received identification pattern and identifies the destination cell from said identification pattern and rank.

7. The method according to claim 6, wherein:

the identification pattern is received in a temporal subdivision of determined rank of the time slot out of a determined number Q of such temporal subdivisions, where 1<Q<N and P×Q≧N;

the identification sequence also comprises at least one stuffing pattern, which is included in each of the Q−1 other temporal subdivisions of the time slot;

the values of the P identification patterns and of the stuffing pattern are such that they correspond to mutually-orthogonal modulated signals; and, the fixed network element also determines the rank of the temporal subdivision of the time slot in which the identification pattern is received, and identifies the destination cell from said identification pattern and said rank.

8. The method according to claim 6, wherein, to determine the identification pattern that is received and, where appropriate, the rank of the temporal subdivision of the time slot in which it is received, the fixed network element performs intercorrelation elation calculations between, on the one hand, a received radio signal, and, on the other hand, radio signals respectively corresponding to the P identification patterns and, where appropriate, to the stuffing pattern.

9. The method according to claim 7, wherein N=16 and wherein the value of the pair (Q,P) is included in the set of pairs {(2,8),(4,4),(8,2)}.

10. The method according to claim 6, wherein the inbound signalling channel is an associated signalling channel, set up in the current cell on an inbound traffic carrier frequency.

11. A computer readable medium having computer executable instructions for executing the method of claim 1.

12. A computer readable medium having computer executable instructions for executing the method of claim 6.

13. A mobile terminal of a digital cellular radiocommunication system which uses a time and/or frequency division multiple access method, and any modulation method, wherein:

the mobile terminal is configured to indicate, when it is in receiving phase in a group call while roaming in a current cell, to a fixed network element of said system, a given destination cell out of a number N of cells adjacent to said current cell, by sending an identification sequence of the destination cell in a time slot of an inbound signalling channel that is a channel with contention;

the identification sequence comprises a determined identification pattern out of a determined number P of identification patterns of different respective values, where P is an integer such that 1<P≦N; and, the values of the P identification patterns are such that they correspond to mutually-orthogonal modulated signals.

14. The mobile terminal according to claim 13, wherein:

the identification pattern is included in a temporal subdivision of determined rank of the time slot out of a determined number Q of such temporal subdivisions, where 1<Q<N and P×Q≧N;

the identification sequence also comprises at least one stuffing pattern, which is included in each of the Q−1 other temporal subdivisions of the time slot;

the values of the P identification patterns and of the stuffing pattern are such that they correspond to mutually-orthogonal modulated signals.

15. The mobile terminal according to claim 14, wherein N=16 and wherein the value of the pair (Q,P) is included in the set of pairs {(2,8),(4,4),(8,2)}.

16. The mobile terminal according to claim 13, wherein the values of the P identification patterns and, where appropriate, the value of the stuffing pattern, are such that they correspond to modulated signals having a low mutual intercorrelation.

17. A mobile terminal according to claim 13, wherein the inbound signalling channel is an associated signalling channel, set up in the current cell on an outbound traffic carrier frequency.

18. A fixed network element of a digital cellular radiocommunication system which uses a time and/or frequency division multiple access method, and any modulation method, wherein:

the fixed network element is configured to receive an indication from a mobile terminal a of said system, when said mobile terminal is in receiving phase in a group call while roaming in a current cell, of a given destination cell out of a number N of cells adjacent to said current cell, by receiving an identification sequence of the destination cell in a time slot of an inbound signalling channel that is a channel with contention;

the identification sequence comprises a determined identification pattern out of a determined number P of identification patterns of different respective values, where P is an integer such that $1<P\leqq N$; and, the values of the P identification patterns are such that they correspond to mutually-orthogonal modulated signals.

19. The fixed network element according to claim 18, wherein:

the identification pattern is included in a temporal subdivision of determined rank of the time slot out of a determined number Q of such temporal subdivisions, where $1<Q<N$ and $P\times Q\geqq N$;

the identification sequence also comprises at least one stuffing pattern, which is included in each of the Q−1 other temporal subdivisions of the time slot;

the values of the P identification patterns and of the stuffing pattern are such that they correspond to mutually-orthogonal modulated signals.

20. The fixed network element according to claim 19, wherein N=16 and wherein the value of the pair (Q,P) is included in the set of pairs {(2,8),(4,4),(8,2)}.

21. The fixed network element according to claim 19, wherein the values of the P identification patterns and, where appropriate, the value of the stuffing pattern, are such that they correspond to modulated signals having a low mutual intercorrelation.

22. The fixed network element according to claim 18, wherein the inbound signalling channel is an associated signalling channel, set up in the current cell on an outbound traffic carrier frequency.

* * * * *